United States Patent [19]
Zerbst et al.

[11] 3,821,554
[45] June 28, 1974

[54] MAGNETIC LENS ASSEMBLIES FOR CORPUSCULAR RAY SUPERCONDUCTIVE DEVICES WHICH OPERATE UNDER VACUUM

[75] Inventors: Helmut Zerbst; Reinhard Weyl; Isolde Dietrich, all of Munich, Germany

[73] Assignee: Siemens Aktiengesellschaft, Berlin, Germany

[22] Filed: June 30, 1971

[21] Appl. No.: 158,373

[30] Foreign Application Priority Data

Sept. 21, 1966 Germany.......................105968

Related U.S. Application Data

[63] Continuation-in-part of Ser. No. 648,623, June 26, 1967.

[52] U.S. Cl................................. 250/396, 313/84
[51] Int. Cl............................................. H01j 37/10
[58] Field of Search............... 250/49.5 D; 335/216; 313/84

[56] References Cited
UNITED STATES PATENTS

| | | | |
|---|---|---|---|
| 3,008,044 | 11/1961 | Buchhold | 250/49.5 D |
| 3,351,754 | 11/1967 | Dietrick | 250/49.5 D |
| 3,500,269 | 3/1970 | Katagiri | 250/49.5 D |
| 3,587,013 | 6/1971 | Dietrick | 250/49.5 D |

Primary Examiner—Archie R. Borchelt
Assistant Examiner—C. E. Church
Attorney, Agent, or Firm—Herbert L. Lerner

[57] ABSTRACT

A magnetic lens assembly for a corpuscular ray device such as an electron microscope, ion microscope, electron-diffraction device or other corpuscular ray apparatus comprises a pair of shielding cylinders of superconductive material which are coaxially spaced from each other and which have their common axis coinciding with the lens axis. The shielding cylinders are surrounded by a lens winding which may also be made of superconductive material. The magnetic field produced by the winding is concentrated by the shielding cylinders in the region of the corpuscular ray. The shielding cylinders have directed toward each other a pair of end faces which are spaced from each other and define between each other a lens gap devoid of any shielding components made of superconductive material. The aperture error constant of the lens assembly depends upon the maximum value of the field intensity in the lens gap and upon the field gradient along the lens axis in the lens gap. The magnitude of the lens gap is chosen in such a way that for a fixed value lens-winding excitation, the maximum value of field intensity in the lens gap and the field gradient in the lens gap along the lens axis are optimized to produce a minimum of the aperture error constant.

14 Claims, 13 Drawing Figures

MAGNETIC LENS ASSEMBLIES FOR CORPUSCULAR RAY SUPERCONDUCTIVE DEVICES WHICH OPERATE UNDER VACUUM

This application is a continuation-in-part of our copending application Ser. No. 648,623, filed June 26, 1967.

Our invention relates to electromagnetic lens assemblies for corpuscular ray devices, in particular to objective lens assemblies for electron microscopes, and is a further development of the invention disclosed in the copending U.S. patent application Ser. No. 389,089, filed Aug. 12, 1964, now U.S. Pat. No. 3,351,754.

It is known to provide a lens assembly which includes along the lens axis with a pair of coaxial mutually spaced shielding cylinders of superconductive material which have their common axis coincide with the lens axis and are thermally connected with a cryogenic refrigerating medium. The shielding cylinders which are thus spaced from each other along the lens axis serve to concentrate in the region of the corpuscular ray a magnetic field generated by lens windings preferably also made of superconductive material and through which current flows.

In such a lens assembly the two shielding cylinders, whose mutually spaced end faces are directed toward each other, form parts of a magnetic shielding structure which generally has the shape of a hollow ring and contains in its hollow space the lens windings. This magnetic shielding structure is made of superconductive material and has its inner wall, which is situated adjacent the corpuscular beam, divided in two shielding cylinders by a ring-shaped opening lying in a plane perpendicular to the beam. This opening accommodates an apertured disc which is superconducting and which has a substantially central aperture for the passage of the corpuscular beam. Because of the presence of this opening in the inner wall of the magnetic shielding structure said inner wall consists of a pair of shielding cylinders which are spaced from each other along the lens axis and which have end faces spaced from and directed toward each other.

It is a primary object of our invention to improve the structure at the region of the lens gap so as to increase the resolving power by reducing the aperture error.

A related object of our invention is to provide a lens assembly where the space between the end faces of the shielding cylinders which define the lens gap is completely devoid of any components made of superconductive material.

A further object of our invention is to provide shielding cylinders with constructions at their mutually spaced ends which define the lens gap which will greatly enhance the formation of a desired magnetic field.

Another object is to afford electrically varying the focal length of the lens assembly though the shielding cylinders and lens gap are fixedly and rigidly mounted.

To achieve those objects, our invention relates primarily to a particular configuration of the arrangement defined by the shielding cylinders which are made of the superconductive material. With the lens assembly of our invention the pair of end faces of the coaxial shielding cylinders which are directed toward each other and define between themselves the lens gap coact with a lens gap which is completely devoid of any shielding elements made of superconductive material. The magnitude of the lens gap is chosen in such a way that at a predetermined value of the field intensity outwardly beyond the lens gap and the shielding cylinders, the maximum value of the field intensity in the lens gap and the field gradient in the lens gap along the lens axis provide a minimized aperture error constant of the lens assembly which is less than a predetermined value of this latter constant corresponding to a desired or prescribed resolving power, for example between 10 and 1A.

With the already proposed construction of the type referred to above, the shielding cylinders created by the ring-shaped opening in the ring-shaped shielding structure serve only to prevent the formation of the field in the region of the corpuscular ray beyond a predetermined location while a further superconducting element in the form of the above-mentioned apertured disc serves to define this predetermined location for influencing the corpuscular beam by the magnetic lens field. In contrast with our invention the construction of the shielding cylinders is such that the lens gap and the shape of the magnetic field within the lens gap are determined solely by the two shielding cylinders. The functions performed by an apertured disc of superconductive material of the type referred to above are instead taken over by the two shielding cylinders themselves, since it is these shielding cylinders of our invention which determine the field relationships at the corpuscular ray.

As a result, the construction of the lens assembly of our invention is simpler. At least by suitably dividing the lens windings it is possible to have easy access to the lens gap. Moreover, where an apertured disc of superconductive material is used, as in the already proposed construction, it is essential to refrigerate the disc with a cryogenic refrigerating medium which is operatively connected to the disc from the outside of the assembly, so that it is possible to collect the field lines in the region of the corpuscular ray, and of course all of these inconveniences and complications are avoided with our construction.

Superconductive materials are used in the electromagnetic lens assemblies because the aperture error of the lens assembly which influences the resolving power of the lens or corpuscular ray device is maintained smaller the larger the magnetic field intensity in the region of the corpuscular ray and the smaller the axial length of this field-filled region. With conventional electromagnetic lenses which operate at normal temperatures and which are provided with iron components for the return flux path as well as for the pole shoes, these requirements, which actually conflict with each other in these conventional constructions, cannot be fullfilled to a degree sufficient for high resolutions because of the magnetic properties of the iron. If, with such conventional constructions, it is desired to achieve high magnetic field intensities in the region of the corpuscular ray, then in order to avoid saturation of the iron, large cross sections of the iron are essential, so that the axial length of that region in which the magnetic lens field acts on the corpuscular ray is undesirably enlarged.

In contrast, when superconducting materials are used it is possible to achieve much higher magnetic field intensities without increasing the axial length of the region where the magnetic field acts on the corpuscular ray to any appreciable degree.

The aperture error constant $C_o$ of an electromagnetic lens assembly depends not only on the maximum value $H_o$ of the field intensity in the lens gap where the field acts on the corpuscular ray, but also on the field gradient along the lens axis in the lens gap.

If an at least approximately bell-shaped field is taken as an illustrative example, then the field gradient for a given maximum value $H_o$ of field intensity in the gap has its magnitude determined by the width at one half the maximum intensity.

Our invention is illustrated by way of example in the accompanying drawings which form part of this application and in which.

Figure 1:
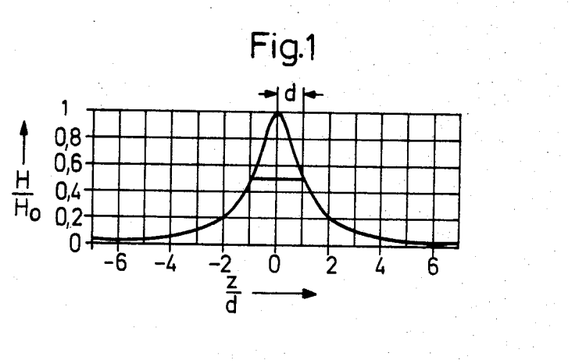
FIG. 1 is an explanatory graph of the relationship between field intensity and field width.

Referring to FIG. 1, the graph shows the horizontal coordinate $z$ which corresponds to the lens axis and which has its starting point O forming the central plane of the lens gap, while the behavior of the field intensity $H/H_o$ in the gap, normalized on the maximum value $H_o$, is indicated along the lens axis in FIG. 1.

The width at half the maximum value of field intensity $2d$ is to be understood, by definition, as the field width where $H/H_o$ is equal to 0.5.

It is apparent that the width at half-maximum field intensity depends upon the dimensions of the pair of shielding cylinders used according to our invention to form the lens gap, at the region of the end faces of these cylinders which are directed toward each other. This dependency applies not only with respect to the distance between the pair of shielding cylinders, which is to say the length of the gap, but also with respect to the configuration of the shielding cylinders in the region of their end faces directed toward each other. Since the shielding cylinders operate in such a way that over their length they prevent the approach of the electromagnetic lens field to the corpuscular ray, while at the same time they are also to solve the task of the above-mentioned apertured disc of superconductive material, namely to provide for entrance of the magnetic field to the largest possible extent into the lens gap, a preferred construction of our invention provides for the end faces of the shielding cylinders a configuration which conforms to the course taken by the field lines. In this way, high values of field intensity at critical locations of the material are avoided so as to also avoid the danger of flux jumping. Moreover, it is possible to provide for the shielding cylinders end faces which are formed differently from each other so that the field is not symmetrical in the gap.

For the same reasons a further construction of the shielding cylinders of our invention provides for the bore of the shielding cylinders a diameter which at least at the lens gap region is as small as possible. By thus reducing the cross-sectional area of the bore at least in the region of the lens gap, this area being reduced to the minimum required for passage of the corpuscular ray, a very sharply defined guiding of the magnetic field in the lens gap and in particular in the region immediately surrounding the corpuscular ray with a definite field gradient is assured.

As has been pointed out above, the aperture error constant $C_o$ of a lens assembly very strongly depends upon the maximum value $H_o$ of the magnetic field intensity in the lens gap. It is therefore also a feature of our invention to situate additional field-generating lens windings in the lens gap so as to increase the maximum value $H_o$ of the field intensity in the lens gap. The additional windings thus augment the effect of the lens windings which surround the shielding cylinders defining the gap. Such additional windings may also be provided to contribute to a predetermined field configuration, to reduce hysteresis phenomena, to permit changing the focal length of the lens by generating a counter-field, or to reduce astigmatism.

As pointed out above, the shielding cylinders prevent formation of the magnetic field in the vicinity of the corpuscular ray, except for the region of the lens gap. For these reasons the length of the shielding cylinders is such that their ends which are directed away from each other preferably extend into a region of negligible field intensity.

In many cases, however, it may be desirable for the purpose of saving space within the vacuum chamber of the corpuscular ray device, to connect to the pair of shielding cylinders further shielding structure of superconductive material, so as to reduce the extension of the magnetic field generated by the lens windings. Preferably, these additional shielding structures surround at all sides the surfaces of the lens windings except the surfaces opposite the shielding cylinders. This shielding structure is thus comparable to the ring-shaped shielding of the already proposed construction.

Since the shielding cylinders are to avoid a considerable increase in length of the field-filled region of the corpuscular ray at the particular field intensity being utilized, it is necessary for the shielding cylinders to have a thickness selected according to the desired field intensity.

Sintered $Nb_3Sn$ has proved to be suitable as a material to be used for the shielding cylinders and also for any further shielding structure. However, where the shielding cylinders made of this sintered material, in order to avoid flux jumping, have relatively thick walls, care must be taken to provide for the magnetic field intensity $H_a$ outwardly beyond the shielding cylinders and the gap a magnitude which increases at only a relatively slow rate after the structure is put in operation. This may reduce the speed of operation of a corpuscular ray device equipped with this type of lens assembly; but such delay can be avoided if porous sintered material is used or if the shielding cylinders and any further shielding structures take the form of preferably disc-shaped carrier bodies made of heat-resistant material and coated with $No_3Sn$, this heat-resistant material being, for example, Nb, Pt or heat resistant steel.

The superconductive materials can be used in connection with materials of normal electrical and thermal conductivity by arranging the superconducting and normal conducting components one after the other in alternating sequence.

Figure 2:
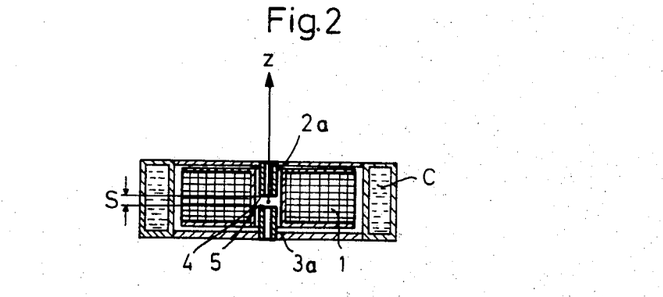
FIG. 2 is a schematic sectional elevation of one embodiment of our invention.
Figure 3:
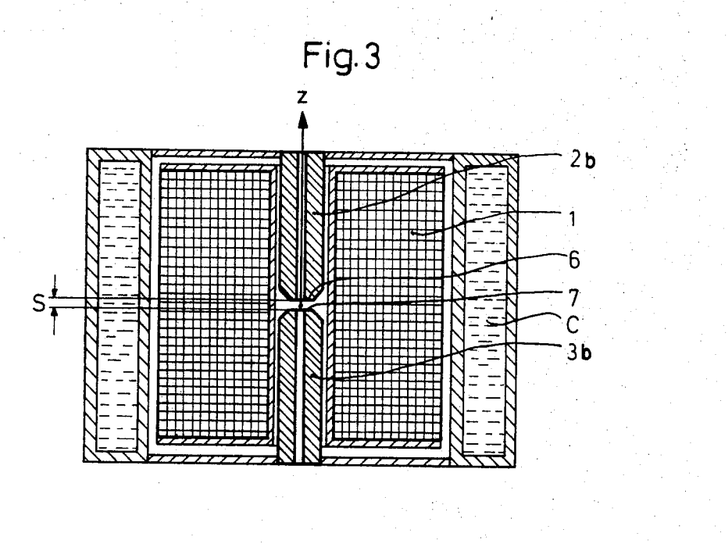
FIG. 3 is a sectional elevation of another embodiment of our invention.

The embodiments of our invention illustrated in FIGS. 2 and 3 have a single field-generating lens winding 1. This lens winding 1 surrounds the shielding cylinders 2a and 3a of FIG. 2 which have a common axis coinciding with and extending along the coordinate z which represents the lens axis. The shielding cylinders 2a and 3a are coaxially aligned along the lens axis and are spaced from each other so that their end faces 4 and 5, respectively, are directed toward each other and form between themselves the lens gap S shown in FIG. 2. The pair of shielding cylinders 2a and 3a of superconductive material thus prevent the formation of the magnetic lens field, generated by the winding 1, in the region of the lens axis z, and thus in the region of the corpuscular ray, except for the space which forms the gap S, and at this latter gap the shielding cylinders provide for the formation of a field of the greatest possible intensity.

The structure of FIG. 3 corresponds generally to that of FIG. 2. However, in order to facilitate the formation of the field in the region of the corpuscular ray within the lens gap S, the shielding cylinders 2b and 3b in FIG. 3 have their respective end faces 6 and 7 shaped to a configuration which conforms to the course taken by the field lens within the lens gap.

Furthermore, the walls of the shielding cylinders 2b and 3b of FIG. 3 are approximately four times as thick as the walls of the shielding cylinders 2a and 3a of FIG. 2. Experience has shown that with this construction of FIG. 3 it is possible to have outside of the shielding cylinders a field intensity $H_a$ which is double that attainable with FIG. 2 without fearing any undesired increase in the length of the field-filled region along the corpuscular ray.

The parts denoted by A, B and D in FIGS. 2 and 3 preferably consist of superconductive material so that the lens windings are surrounded by superconductive material on all sides except at the side directed toward the shielding cylinders. This prevents the corpuscular beam from being affected by stray fields.

Preferably the outer end faces of the shielding cylinders, namely those directed away from each other, should not be situated in regions of relatively high magnetic field intensity. This can be avoided by increasing the length of the shielding cylinders or by providing additional shielding. It is possible to increase the length so that the outer ends of the cylinders are situated in regions of negligible field intensity. In some cases, particularly at very high field intensities, resort may be had to both increasing the length of the shielding cylinders and also providing additional shielding structure.

As mentioned, in the embodiment of FIG. 3 the shape of the end faces 6 and 7 of the shielding cylinders 2b and 3b substantially conforms to the course of the field lines in the lens gap S. FIGS. 4–9 illustrate various other constructions of this type which have proved to practice to be highly favorable.

Figure 4:
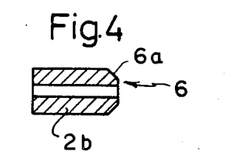
FIGS. 4–9 respectively illustrate different configurations at the inner ends of the shielding cylinders.

Thus, FIG. 4 shows the shielding cylinder 2b of FIG. 3 and in particular the end face 6 thereof provided with the bevelled frustoconical exterior surface portions 6a, as is also illustrated in FIG. 3. Of course, the other shielding cylinder has its end face 7 constructed in the same way; and in FIGS. 5–9 it is to be understood that the illustrated shielding cylinders coact with identical shielding cylinders which have oppositely directed end faces.

Figure 5:
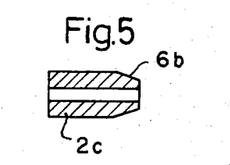

Thus, in the case of FIG. 5 the shielding cylinder 2c is provided with an end face having a frustoconical surface 6b forming part of a cone whose apex angle is substantially smaller than the apex angle of a cone which includes in the surface 6a of FIG. 4. Particularly in those cases where the field intensity $H_a$ is relatively high outside of the gap, this construction of FIG. 5 results in an increase in the maximum value $H_o$ of the field intensity. However, this latter advantage is achieved with but a small increase in length of the field-filled region along the corpuscular ray.

Figure 6:
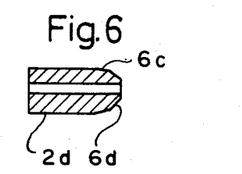
Figure 7:
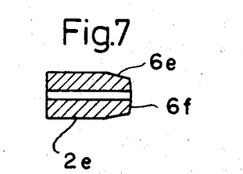

In the embodiment of FIG. 6, the shielding cylinder 2d has a pair of exterior frustoconical surface portions 6c and 6d which have different angles so as to conform to an even greater degree to the course taken by the field lines. In the embodiment of FIG. 7, the shielding cylinder 2e has a rounded convex end face 6f surrounding the bore of the shielding cylinder and situated at the end of a frustoconical surface 6e which conforms generally to the surface 6b of FIG. 5.

Figure 8:
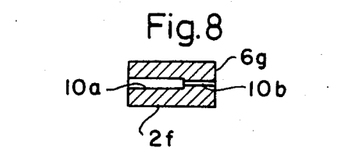

In the embodiment of FIG. 8, the end face 6g of the shielding cylinder 2f is completely flat and situated in a plane which is normal to the lens axis. However, in this embodiment the bore 10a of the shielding cylinder terminates in the region of the lens gap in a reduced bore portion 10b which has an extremely small diameter just sufficiently great to permit the corpuscular ray to pass therethrough. This construction of FIG. 8 results in a large maximum value $H_o$ of the field intensity in the gap together with a small length of the field-filled region along the corpuscular ray.

Figure 9:
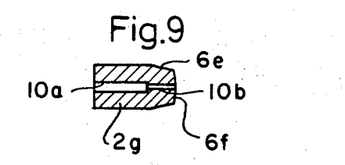

FIG. 9 shows a variation of the embodiment of FIG. 8 according to which the shielding cylinder 2g of FIG. 9 has the same bore portions 10a and 10b as those shown in FIG. 8 while including the same exterior surface portions 6e and 6f as those shown in FIG. 7.

As is apparent from the features of FIGS. 4–9, the distance S between the shielding cylinders, the length thereof, and the configuration of their end faces which define and limit the lens gap must to a large extent be empirically determined in accordance with the special relationships which are encountered in the particular corpuscular ray device.

Figure 10:
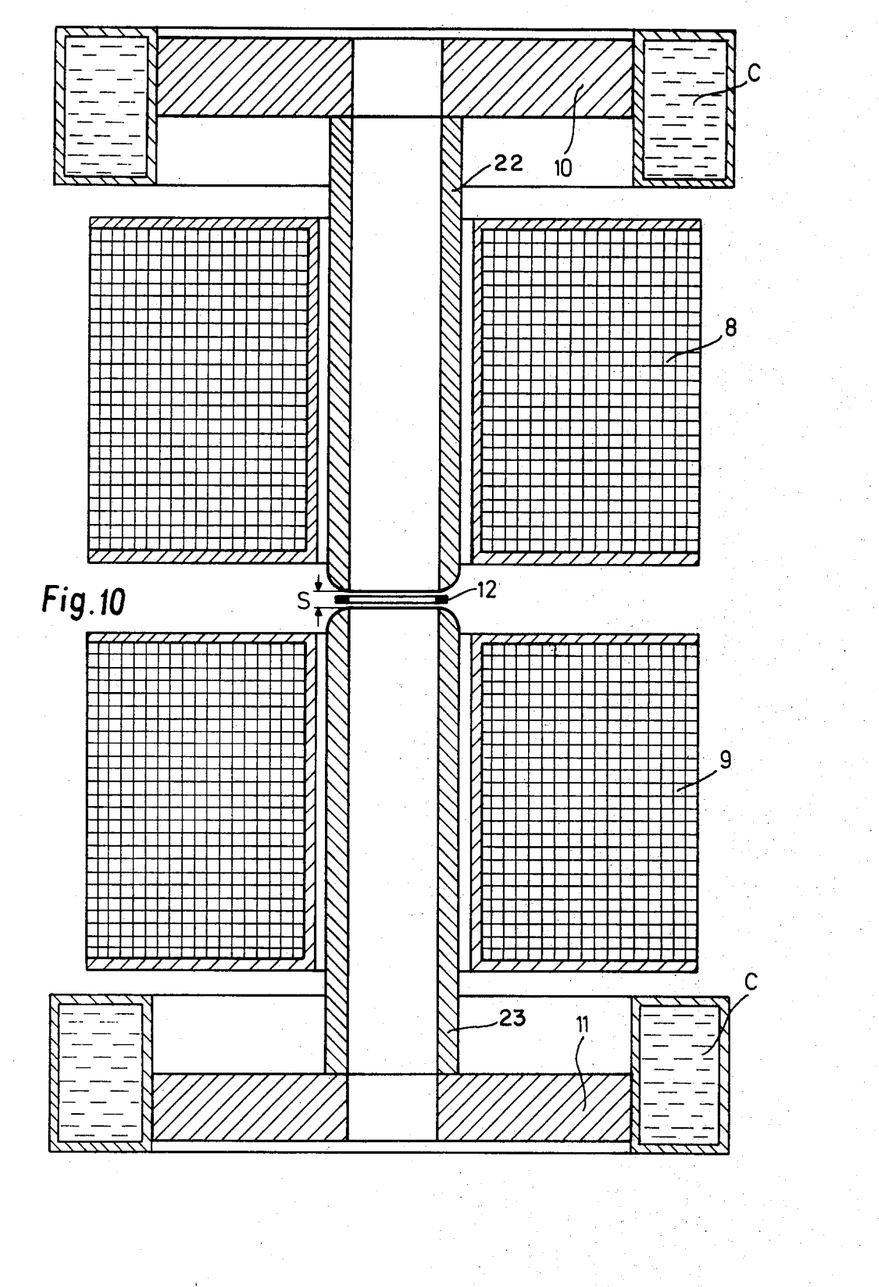
FIG. 10 is a longitudinal section elevation schematically illustrating a further embodiment of a lens assembly according to our invention.

FIG. 10 shows an embodiment of our invention where the lens assembly is provided with shielding cylinders 22 and 23 respectively corresponding to the above shielding cylinders, such as those shown in FIGS. 2 and 3. However, whereas in FIGS. 2 and 3 a single lens winding 1 surrounds both shielding cylinders, in the embodiment of FIG. 10 a pair of separate spaced lens windings 8 and 9 respectively surround the pair of shielding cylinders 22 and 23. These shielding cylinders 22 and 23 of FIG. 10 are provided with additional superconductive shielding structures 10 and 11.

In all embodiments the shielding cylinders are in thermal conductivity with a cryogenic refrigerating medium, and in FIGS. 2, 3 and 10, this cryogenic refrigerating means takes the form of containers C/A in which a cryogenic medium such as liquid helium is located, for example.

The division of the lens winding means into a pair of individual lens windings 8 and 9 as shown in FIG. 10 provide a gap S which is of easy accessibility. This permits arranging in or at the gap S additional windings 12, as indicated in FIG. 10. However, it is also possible to place in this gap S a suitable specimen, a diaphragm, or a stigmator element, these elements being introducible into the gap S from the side.

Figure 11:
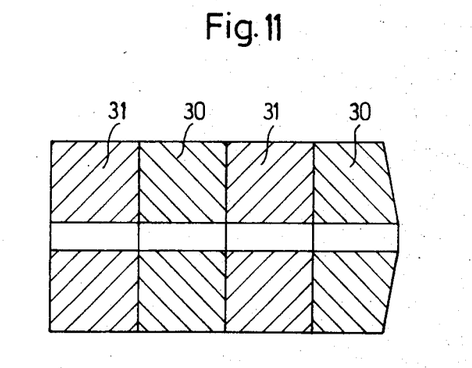
FIGS. 11 and 12 show two modifications respectively of shielding cylinders.

According to FIG. 11, the shielding cylinders may be made by arranging disc-shaped components 30 of superconducting material and components 31 of normal conductivity one after the other in alternating sequence.

Figure 12:
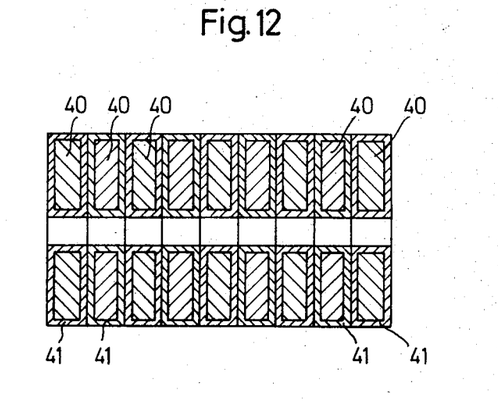

FIG. 12 shows a shielding cylinder avoiding flux jumping after the structure is turned on. This cylinder comprises disc-shaped carrier bodies 40 made of heat-resistive material and coated with layers 41 of $Nb_3Sn$.

It will be understood from the foregoing that our invention provides a further development of lens assemblies generally of the type according to U.S. Pat. No. 3,351,754 by forming the shielding cylinders in such a manner that they take over and perform the functions of the additional superconducting apertured disc of the assemblies.

As explained, the aperture error is the smaller the larger the magnetic field strength ($H_o$ in FIG. 1) and the smaller the length of the field-occupied region, i.e., the half-widths 2d (FIG. 1). Hence, there can be stated for $H_o$ a lower limit and for 2d an upper limit whose observance results in achieving a minimized aperture error. These limits can be determined as $H_o = 40$ kOe (kilo Oersted) for the field strength in the lens gap, and 8 mm for the half-width 2d of the field in the gap along the beam axis. These limit values for $H_o$ and 2d, according to the present state of the art, cannot be simultaneously attained with conventional ferromagnetic lenses.

The significance of these limit values will be more fully apparent from the following:

A characteristic magnitude of the lens properties is the so-called lens strength $k^2$ which is determined by the equation:

$$k^2 = e/8m_o \quad H_o^2 d^2/U^*,$$

wherein $e$ denotes the charge and $m_o$ the rest mass of the electron, and $U^*$ is the relativistically corrected beam voltage.

Figure 13:
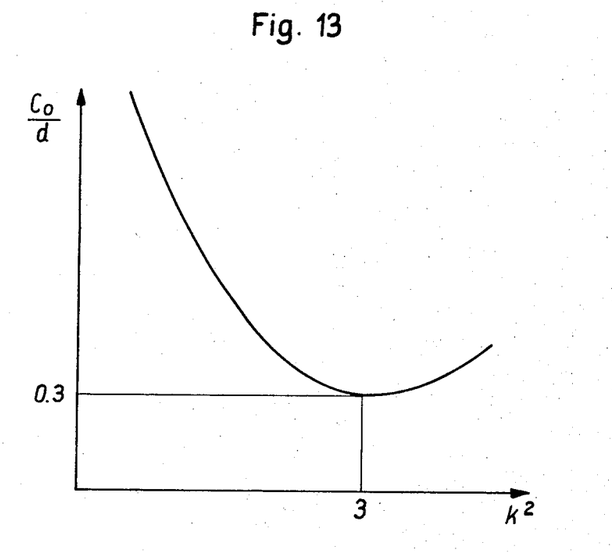
FIG. 13 is an explanatory graph.

If according to the graph of FIG. 13 the quotient $C_o/d$ is plotted over the lens strength $k^2$, then the resulting curve has a minimum at approximately $k^2 = 3$ this minimum being at $C_o/d = 0.3$. For minimizing the aperture error, the significant quantities therefore must be so chosen that $k^2$ is approximately equal to 3 and furthermore a lowest feasible value of $d$ must be aimed at. It follows from the latter condition that $H_o$ must be correspondingly high. It also can be recognized that the condition $k^2 = 3$ at a small value of $d$ becomes the more difficult to satisfy the larger the beam voltage. A lens assembly according to the present invention therefore is particularly advantageous for high beam voltages.

This will be elucidated by the following numerical examples for different beam voltages.

EXAMPLE 1

Beam voltage U = 0.55 MeV
magnetic field strength outside of the shielding cylinders $H_a$ = 60 kOe
gap length S = 4.0 mm
maximal field optical axis $H_o$ = 50 kOe
half-width of the field 2d = 4.0 mm.
aperture error constant $C_o$ = 0.4 mm
resolving power according to Scherzer $\delta s = 0.9$ A

EXAMPLE 2

Beam voltage U = 1.8 MeV
magnetic field strength outside shielding cylinders $H_a$ = 82 kOe
gap length S = 5.0 mm
maximal field on the optical axis $H_o$ = 73 kOe
half-width of the field 2d = 6.4 mm
aperture error constant $C_o$ = 1.0 mm
resolving power according to Scherzer $\delta s = 0.5$ A To those skilled in the art it will be obvious upon a study of this disclosure that our invention permits of various other modifications and hence may be given embodiments other than those particularly illustrated and described herein, without departing from the essential features of our invention and within the scope of the claims annexed hereto.

We claim:
1. In a magnetic lens assembly for a corpuscular ray device which is to operate under vacuum, such as an objective lens assembly of an electron microscope, a pair of coaxial shielding cylinders spaced from each other and having a common axis coinciding with a lens axis of the assembly, said shielding cylinders being made of a superconductive material, a cryogenic refrigerating means thermally connected with said cylinders, lens winding means surrounding said cylinders for generating a magnetic field, said cylinders concentrating said field in the region of a corpuscular ray traveling along said lens axis and said shielding cylinders respectively terminating in a pair of end faces which are directed toward each other and which define between themselves a lens gap which is devoid of any shielding components made of superconductive material, said gap having an axial length which for a given constant value of field intensity outwardly beyond the lens gap and a maximum value of field intensity in the lens gap and a maximum field gradient in the lens gap along said lens axis provides a minimum aperture error constant of the lens assembly.

2. In the combination of claim 1, said shielding cylinders being fixedly mounted relative to each other.

3. The combination of claim 1 wherein said end faces of said shielding cylinders which define said lens gap have a generally convex configuration which substantially corresponds to the course of the field lines.

4. The combination of claim 1 wherein said shielding cylinders are respectively formed with axial bores passing therethrough, said bores having smaller cross sectional area at said lens gap than remote from said gap.

5. The combination of claim 1 wherein additional field-generating lens windings are situated around said lens gap.

6. The combination of claim 1 wherein said respective shielding cylinders are elongated and extend from said lens-gap into a region of negligible field intensity.

7. The combination of claim 1 wherein said shielding cylinders are made of sintered $Nb_3Sn$.

8. The combination of claim 1 wherein said shielding cylinders are made of carrier bodies of heat-resistant material coated with $Nb_3Sn$.

9. The combination of claim 1 wherein components of superconductive material are connected with components which are of normal electrical and thermal conductivity.

10. The combination of claim 1 wherein additional superconductive shielding material is provided to surround said lens winding means at all sides except at the side directed toward the said shielding cylinders.

11. The combination of claim 1 wherein said lens windings means consist of superconductive material.

12. The combination of claim 1 wherein additional superconductive shielding material is situated at the exterior of said lens winding means surrounding said shielding cylinders.

13. The combination of claim 12 wherein additional lens windings are provided around said lens gap, said additional windings have a winding axis coincident with the lens axis.

14. In a magnetic lens assembly for a corpuscular ray device which is to operate under vacuum, such as an objective lens assembly of an electron microscope, a pair of shielding cylinders of superconductive material axially spaced a fixed distance from each other and having a common axis coinciding with the lens axis of the assembly, cryogenic means thermally connected with said cylinders, lens winding means surrounding said cylinders for generating a magnetic field, said cylinders concentrating said field in the region of a corpuscular ray traveling along said lens axis, said shielding cylinders terminating in a pair of respective end faces directed toward each other and defining between each other a lens gap which is devoid of any shielding components of superconductive material, the axial length of said gap being selected to provide a minimum aperture error constant by having, for a given constant value of field intensity beyond said lens gap and said shielding cylinders, a maximal field strength ($H_o$) of at least 30 kOe in said gap and at most an 8 mm half-width ($2d$) of the field along the axis in said gap.

* * * * *